US012033553B2

(12) United States Patent
Tian

(10) Patent No.: US 12,033,553 B2
(45) Date of Patent: Jul. 9, 2024

(54) DISPLAY PANEL INTEGRATED WITH GATE DRIVING CIRCUIT IN DISPLAY AREA

(71) Applicant: Wuhan China Star Optoelectronics Technology Co., Ltd., Wuhan (CN)

(72) Inventor: Chao Tian, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/605,043

(22) PCT Filed: Jun. 1, 2021

(86) PCT No.: PCT/CN2021/097649

§ 371 (c)(1),
(2) Date: Oct. 20, 2021

(87) PCT Pub. No.: WO2022/241844

PCT Pub. Date: Nov. 24, 2022

(65) Prior Publication Data

US 2024/0021121 A1 Jan. 18, 2024

(30) Foreign Application Priority Data

May 17, 2021 (CN) ......................... 202110535955.7

(51) Int. Cl.
*G09G 3/20* (2006.01)

(52) U.S. Cl.
CPC ....... *G09G 3/20* (2013.01); *G09G 2300/0408* (2013.01); *G09G 2310/0267* (2013.01)

(58) Field of Classification Search
None
See application file for complete search history.

(56) References Cited

U.S. PATENT DOCUMENTS

| | | | | |
|---|---|---|---|---|
| 2015/0161956 | A1* | 6/2015 | Lee | G09G 3/3688 438/30 |
| 2018/0218668 | A1* | 8/2018 | Aoyagi | G09G 3/32 |
| 2018/0331125 | A1 | 11/2018 | Wang et al. | |

FOREIGN PATENT DOCUMENTS

| | | | |
|---|---|---|---|
| CN | 105575318 | A | 5/2016 |
| CN | 106133819 | A | 11/2016 |
| CN | 106415704 | A | 2/2017 |
| CN | 106935214 | A | 7/2017 |
| CN | 107145021 | A | 9/2017 |
| CN | 108806503 | A | 11/2018 |
| CN | 108847178 | A | 11/2018 |
| CN | 108847415 | A | 11/2018 |

(Continued)

*Primary Examiner* — Amare Mengistu
*Assistant Examiner* — Sarvesh J Nadkarni
(74) *Attorney, Agent, or Firm* — Nathan & Associates; Menachem Nathan

(57) ABSTRACT

A display panel integrated with a gate driving circuit in a display area is provided. In the display panel, gate driving signal lines and data lines are not arranged side by side between any same adjacent two columns of sub-pixels. This avoids possibility of arranging the data lines and the gate driving signal lines side by side between any same adjacent two columns of sub-pixels, prevents the data lines from being easily disturbed by a parasitic capacitance generated between the data lines and the gate driving signal lines, and also avoids abnormal images on the display panel.

14 Claims, 5 Drawing Sheets

(56) References Cited

FOREIGN PATENT DOCUMENTS

| | | | |
|---|---|---|---|
| CN | 110277050 | A | 9/2019 |
| CN | 111613183 | A | 9/2020 |
| CN | 112509463 | A | 3/2021 |
| CN | 112673417 | A | 4/2021 |
| KR | 20180028098 | A | 3/2018 |

* cited by examiner

DISPLAY PANEL INTEGRATED WITH GATE DRIVING CIRCUIT IN DISPLAY AREA

FIELD OF INVENTION

The present application relates to the field of display technologies, and more particularly to a display panel integrated with a gate driving circuit in a display area.

BACKGROUND OF INVENTION

Current gate driving circuits, such as GOA (gate driven on array) circuits are mainly designed on one or both sides of a display panel. With the continuous development of current full-screen mobile phones and in the face of more diverse and complex applications of display panels such as vehicles, this requires a frame of the display panel to become narrower and narrower, and when a width of the gate driving circuit cannot be compressed, the frame of the display panel cannot be reduced. Based on this defect, researchers have proposed GIA (gate driven in array) technology. That is, the technology of integrating the gate driving circuit in a display area of the display panel. This technology means that the gate drive circuit is directly drawn from the display area of the display panel, so that the frame of the display panel can be further reduced.

FIG. 1 is a positional distribution diagram of sub-pixels, data lines, and gate driving signal lines (GOA signal lines) of a display panel integrated with a gate driving circuit in a display area of the prior art. As shown in FIG. 1, the display panel comprises a gate line and a data line. The gate line and the data line perpendicularly intersect to form an array of sub-pixels. In the area of each sub-pixel, the red, green, and blue sub-pixels included in each sub-pixel are connected to the corresponding gate line. The data line corresponding to each sub-pixel is arranged between the sub-pixel and the adjacent sub-pixel. The gate driving signal lines (such as a clock signal line CK, a constant voltage high potential line VGH and a constant voltage low potential line VGL, etc.) and the data lines are arranged side by side between two adjacent columns of sub-pixels. Each gate driving signal module is used to connect the gate driving signal line between two adjacent columns of sub-pixels with the corresponding gate line. For example, as shown in FIG. 1, there are two gate driving signal lines, namely GOA_S1 and GOA_S2. The data line DataG corresponding to GOA_S1 and the green sub-pixel G is arranged side by side between the red sub-pixel R and the green sub-pixel G. The data line DataB corresponding to GOA_S2 and the blue sub-pixel B is arranged side by side between the green sub-pixel G and the blue sub-pixel B.

Because the gate driving signal line and the data line are arranged side by side between adjacent sub-pixels, a large parasitic capacitance will exist between the GOA signal line and the data line. The data line is susceptible to interference from the gate driving signal line side by side, which makes the data voltage of the pixel corresponding to the data line unstable during image display. This is easy to cause abnormalities in the display panel.

SUMMARY OF INVENTION

In order to solve the problem that when the gate driving signal line and the data line are arranged side by side between the same two adjacent columns of sub-pixels, the data line is susceptible to interference from the gate driving signal line side by side, an embodiment of the present application provides a display panel integrated with a gate driving circuit in a display area comprising sub-pixels arranged in the display area and gate lines, data lines, and gate driving signal lines for driving the sub-pixels, wherein the data lines and the gate driving signal lines are arranged perpendicular to the gate lines. The gate driving signal lines are connected to the gate lines, and wherein the gate driving signal lines are arranged between two rows of the sub-pixels adjacent to the gate driving signal lines, the data lines are arranged between two columns of the sub-pixels adjacent to the data lines, and there is only one of the gate driving signal lines and the data lines between any two adjacent columns of the sub-pixels, such that the gate driving signal lines and the data lines are not arranged side by side between any of the same two adjacent columns of the sub-pixels.

In some embodiments, at least two gate driving signal lines are provided between the two columns of the sub-pixels adjacent to the gate driving signal lines.

In some embodiments, the display panel further comprises a gate driving signal module, and the gate driving signal module is used to connect the gate driving signal lines to the gate lines and control timing of the gate driving signal lines.

In some embodiments, the display panel is a multiplexed display panel, and a plurality of the data lines arranged side by side between the two adjacent columns of the sub-pixels are controlled on and off by the same multiplexing control signal.

In some embodiments, the display panel is a 1-to-2 multiplexed display panel, the 1-to-2 multiplexed display panel comprises a plurality of first repeating units arranged in sequence, and each of the first repeating units comprises two groups of periodically arranged sub-pixels, the data lines corresponding to each of the sub-pixels, and at least two of the gate driving signal lines corresponding to each group of the sub-pixels; wherein the gate driving signal lines corresponding to the sub-pixels in a first group are first gate driving signal lines, and the gate driving signal lines corresponding to the sub-pixels in a second group are second gate driving signal lines. The data lines corresponding to first sub-pixels of a first group and the data lines corresponding to second sub-pixels of a first group are arranged between first sub-pixels of the first group and second sub-pixels of the first group, at least two of the first gate driving signal lines are arranged between second sub-pixels of the first group and third sub-pixels of first group, the data lines corresponding to third sub-pixels of the first group are arranged between third sub-pixels of the first group and first sub-pixels of a second group, the data lines corresponding to the first sub-pixels of the second group are arranged between the first sub-pixels of the second group and the second sub-pixels of the second group, the data lines corresponding to the second sub-pixels of the second group and the data lines corresponding to third sub-pixels of the second group are arranged between the second sub-pixels of the second group and third sub-pixels of the second group, and at least two of the second gate driving signal lines are arranged between third sub-pixels of the second group and first sub-pixels of the first group of a next first repeating unit.

In some embodiments, the 1-to-2 multiplexed display panel generates two multiplexed control signals in each scan line time-sharing, and two data lines corresponding to each two adjacent columns of sub-pixels provide data signals in time sharing from a common output channel. In every two of the first repeating units, in a first of the first repeating units, the data lines corresponding to first sub-pixels of the first group and the data lines corresponding to second sub-pixels of the first group are controlled on and off by first multiplexing control signals, the data lines corresponding to the third sub-pixels in the first group and the data lines corresponding to the first sub-pixels in the second group are controlled on and off by second multiplexing control signals, and the data lines corresponding to the second sub-pixels of the second group and the data lines corresponding to the third sub-pixels of the second group are controlled on and off by the first multiplexing control signals. In the second of the first repeating units, the data lines corresponding to first sub-pixels of the first group and the data lines corresponding to second sub-pixels of the first group are controlled on and off by the second multiplexing control signals, the data lines corresponding to third sub-pixels of the first group and the data lines corresponding to first sub-pixels of the second group are controlled on and off by the first multiplexing control signals, and the data lines corresponding to the second sub-pixels of the second group and the data lines corresponding to third sub-pixels of the second group are controlled on and off by the second multiplexing control signals.

In some embodiments, each of the first repeating units further comprises two gate driving signal modules, a first gate driving signal module is used to connect at least two of the first gate driving signal lines between second sub-pixels of the first group and third sub-pixels of the first group to corresponding gate lines and control timing of at least two of the first gate driving signal lines, and a second gate driving signal module is used to connect at least two of the second gate driving signal lines between third sub-pixels of the second group and first sub-pixels of the first group of a next first repeating unit to corresponding gate lines and control timing of the second gate driving signal line.

In some embodiments, the display panel is a 1-to-3 multiplexed display panel, the 1-to-3 multiplexed display panel comprises a plurality of second repeating units arranged in sequence, each of the second repeating units comprises two groups of periodically arranged sub-pixels, the data lines corresponding to each of the sub-pixels, and at least two gate driving signal lines corresponding to each group of sub-pixels; wherein the gate driving signal lines corresponding to the sub-pixels of the first group are first gate driving signal lines, and the gate driving signal lines corresponding to the second group of sub-pixels are second gate driving signal lines. The data lines corresponding to first sub-pixels of the first group and the data lines corresponding to second sub-pixels of the first group are arranged between first sub-pixels of the first group and second sub-pixels of the first group, at least two of the first gate driving signal lines are arranged between second sub-pixels of the first group and third sub-pixels of the first group, the data lines corresponding to third sub-pixels of the first group are arranged between third sub-pixels of the first group and first sub-pixels of the second group, the data lines corresponding to the first sub-pixels in the second group and the data lines corresponding to the second sub-pixels in the second group are arranged between the first sub-pixels in the second group and the second sub-pixels in the second group, at least two of the second gate driving signal lines are arranged between the second sub-pixels of the second group and third sub-pixels of the second group, and the data lines corresponding to the third sub-pixels of the second group are arranged between the third sub-pixels of the second group and the first sub-pixels of the first group of the next second repeating unit.

In some embodiments, the 1-to-3 multiplexed display panel generates 3 multiplexed control signals in each scan line time-sharing, and the three data lines corresponding to each group of red, green and blue sub-pixels are provided with data signals by a common output channel in a time-sharing manner. In each of the second repeating units, the data lines corresponding to first sub-pixels of the first group and the data lines corresponding to second sub-pixels of the first group are controlled on and off by the first multiplexing control signal, the data lines corresponding to the first sub-pixels of the second group and the data lines corresponding to the second sub-pixels of the second group are controlled on and off by the second multiplexing control signal, and the data lines corresponding to third sub-pixels of the first group and the data lines corresponding to third sub-pixels of the second group are controlled on and off by the third multiplexing control signal.

In some embodiments, each of the second repeating units further comprises two gate driving signal modules, the first gate driving signal module is used to connect at least two of the first gate driving signal lines between second sub-pixels of the first group and third sub-pixels of the first group to the corresponding gate lines and control timing of at least two of the first gate driving signal lines, and the second gate driving signal module is used to connect at least two of the second gate driving signal lines between the second sub-pixels of the second group and third sub-pixels of the second group to the corresponding gate lines and control timing of at least two of the second gate driving signal lines.

In some embodiments, the gate driving signal line comprises a clock signal line, a start signal line, a constant voltage high potential line, and a constant voltage low potential line.

In addition, an embodiment of the present application also provides a display panel comprising sub-pixels arranged in the display area, and gate lines, data lines, and gate driving signal lines for driving the sub-pixels. The data lines and the gate driving signal lines are arranged perpendicular to the gate lines. The gate driving signal lines are connected to the gate lines, and wherein the gate driving signal lines are arranged between two rows of the sub-pixels adjacent to the gate driving signal lines, the data lines are arranged between two columns of the sub-pixels adjacent to the data lines, and there is only one of the gate driving signal lines and the data lines between any two adjacent columns of the sub-pixels, such that the gate driving signal lines and the data lines are not arranged side by side between any of the same two adjacent columns of the sub-pixels, and wherein the gate driving signal line comprises a clock signal line, a start signal line, a constant voltage high potential line, and a constant voltage low potential line.

In some embodiments, the display panel further comprises a gate driving signal module, and the gate driving signal module is used to connect the gate driving signal lines to the gate lines and control timing of the gate driving signal lines.

In some embodiments, the display panel is a multiplexed display panel, and a plurality of the data lines arranged side by side between the two adjacent columns of the sub-pixels are controlled on and off by the same multiplexing control signal.

In some embodiments, the display panel is a 1-to-2 multiplexed display panel, the 1-to-2 multiplexed display panel comprises a plurality of first repeating units arranged in sequence, and each of the first repeating units comprises two groups of periodically arranged sub-pixels, the data lines corresponding to each of the sub-pixels, and at least two of the gate driving signal lines corresponding to each group of the sub-pixels; wherein the gate driving signal lines corresponding to the sub-pixels in a first group are first gate driving signal lines, and the gate driving signal lines corresponding to the sub-pixels in a second group are second gate driving signal lines. The data lines corresponding to first sub-pixels of a first group and the data lines corresponding to second sub-pixels of a first group are arranged between first sub-pixels of the first group and second sub-pixels of the first group, at least two of the first gate driving signal lines are arranged between second sub-pixels of the first group and third sub-pixels of first group, the data lines corresponding to third sub-pixels of the first group are arranged between third sub-pixels of the first group and first sub-pixels of a second group, the data lines corresponding to the first sub-pixels of the second group are arranged between the first sub-pixels of the second group and the second sub-pixels of the second group, the data lines corresponding to the second sub-pixels of the second group and the data lines corresponding to third sub-pixels of the second group are arranged between the second sub-pixels of the second group and third sub-pixels of the second group, and at least two of the second gate driving signal lines are arranged between third sub-pixels of the second group and first sub-pixels of the first group of a next first repeating unit.

In some embodiments, the 1-to-2 multiplexed display panel generates two multiplexed control signals in each scan line time-sharing, and two data lines corresponding to each two adjacent columns of sub-pixels provide data signals in time sharing from a common output channel. In every two of the first repeating units, in a first of the first repeating units, the data lines corresponding to first sub-pixels of the first group and the data lines corresponding to second sub-pixels of the first group are controlled on and off by first multiplexing control signals, the data lines corresponding to the third sub-pixels in the first group and the data lines corresponding to the first sub-pixels in the second group are controlled on and off by second multiplexing control signals, and the data lines corresponding to the second sub-pixels of the second group and the data lines corresponding to the third sub-pixels of the second group are controlled on and off by the first multiplexing control signals. In the second of the first repeating units, the data lines corresponding to first sub-pixels of the first group and the data lines corresponding to second sub-pixels of the first group are controlled on and off by the second multiplexing control signals, the data lines corresponding to third sub-pixels of the first group and the data lines corresponding to first sub-pixels of the second group are controlled on and off by the first multiplexing control signals, and the data lines corresponding to the second sub-pixels of the second group and the data lines corresponding to third sub-pixels of the second group are controlled on and off by the second multiplexing control signals.

In some embodiments, each of the first repeating units further comprises two gate driving signal modules, a first gate driving signal module is used to connect at least two of the first gate driving signal lines between second sub-pixels of the first group and third sub-pixels of the first group to corresponding gate lines and control timing of at least two of the first gate driving signal lines, and a second gate driving signal module is used to connect at least two of the second gate driving signal lines between third sub-pixels of the second group and first sub-pixels of the first group of a next first repeating unit to corresponding gate lines and control timing of the second gate driving signal line.

In some embodiments, the display panel is a 1-to-3 multiplexed display panel, the 1-to-3 multiplexed display panel comprises a plurality of second repeating units arranged in sequence, each of the second repeating units comprises two groups of periodically arranged sub-pixels, the data lines corresponding to each of the sub-pixels, and at least two gate driving signal lines corresponding to each group of sub-pixels; wherein the gate driving signal lines corresponding to the sub-pixels of the first group are first gate driving signal lines, and the gate driving signal lines corresponding to the second group of sub-pixels are second gate driving signal lines. The data lines corresponding to first sub-pixels of the first group and the data lines corresponding to second sub-pixels of the first group are arranged between first sub-pixels of the first group and second sub-pixels of the first group, at least two of the first gate driving signal lines are arranged between second sub-pixels of the first group and third sub-pixels of the first group, the data lines corresponding to third sub-pixels of the first group are arranged between third sub-pixels of the first group and first sub-pixels of the second group, the data lines corresponding to the first sub-pixels in the second group and the data lines corresponding to the second sub-pixels in the second group are arranged between the first sub-pixels in the second group and the second sub-pixels in the second group, at least two of the second gate driving signal lines are arranged between the second sub-pixels of the second group and third sub-pixels of the second group, and the data lines corresponding to the third sub-pixels of the second group are arranged between the third sub-pixels of the second group and the first sub-pixels of the first group of the next second repeating unit.

In some embodiments, the 1-to-3 multiplexed display panel generates 3 multiplexed control signals in each scan line time-sharing, and the three data lines corresponding to each group of red, green and blue sub-pixels are provided with data signals by a common output channel in a time-sharing manner. In each of the second repeating units, the data lines corresponding to first sub-pixels of the first group and the data lines corresponding to second sub-pixels of the first group are controlled on and off by the first multiplexing control signal, the data lines corresponding to the first sub-pixels of the second group and the data lines corresponding to the second sub-pixels of the second group are controlled on and off by the second multiplexing control signal, and the data lines corresponding to third sub-pixels of the first group and the data lines corresponding to third sub-pixels of the second group are controlled on and off by the third multiplexing control signal.

In some embodiments, each of the second repeating units further comprises two gate driving signal modules, the first gate driving signal module is used to connect at least two of the first gate driving signal lines between second sub-pixels of the first group and third sub-pixels of the first group to the corresponding gate lines and control timing of at least two of the first gate driving signal lines, and the second gate driving signal module is used to connect at least two of the second gate driving signal lines between the second sub-pixels of the second group and third sub-pixels of the second group to the corresponding gate lines and control timing of at least two of the second gate driving signal lines.

Beneficial effect: An embodiment of the present application provides a display panel integrated with a gate driving circuit in a display area. The display panel has a single data line, or a single gate driving signal line, or a data line and a data line side by side, or the gate driving signal line and the gate driving signal line are arranged side by side between any same adjacent two columns of sub-pixels. Therefore, the gate driving signal line and the data line are not arranged side by side between any same adjacent two columns of sub-pixels. In order to further reduce the frame of the display panel in the display panel with integrated gate driving circuit, the data line and the gate driving signal line may be arranged side by side when the gate driving circuit is led out from the display area. Between two adjacent columns of sub-pixels, the data line is susceptible to interference from the parasitic capacitance generated between the gate driving signal line and the data line. As a result, the data voltage maintained by the pixel corresponding to the new data line during image display is unstable, and the display panel has a problem of abnormal picture.

DETAILED DESCRIPTION OF PREFERRED EMBODIMENTS

Figure 1:
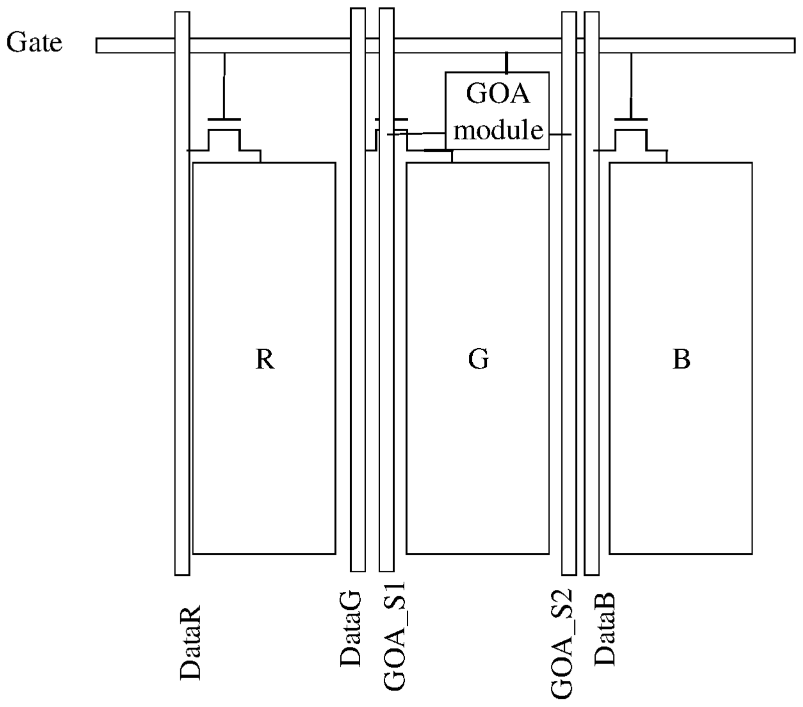
FIG. 1 is a positional distribution diagram of sub-pixels, data lines, and gate driving signal lines of a display panel integrated with a gate driving circuit in a display area of the prior art.

In order to make the purpose, technical solutions, and effects of this application clearer and clearer, the following further describes this application in detail with reference to the accompanying drawings and examples. It should be understood that the specific embodiments described here are only used to explain the present application and are not used to limit the present application.

An embodiment of the present application provides a display panel integrated with a gate driving circuit in a display area comprising sub-pixels arranged in the display area and gate lines, data lines, and gate driving signal lines for driving the sub-pixels, wherein the data lines and the gate driving signal lines are arranged perpendicular to the gate lines. The gate driving signal lines are connected to the gate lines, and wherein the gate driving signal lines are arranged between two rows of the sub-pixels adjacent to the gate driving signal lines, the data lines are arranged between two columns of the sub-pixels adjacent to the data lines, and there is only one of the gate driving signal lines and the data lines between any two adjacent columns of the sub-pixels, such that the gate driving signal lines and the data lines are not arranged side by side between any of the same two adjacent columns of the sub-pixels. Sub-pixels refer to red, green, and blue sub-pixels included in each pixel unit.

It should be noted that the gate driving circuit such as the GOA circuit includes multi-level GOA units. Each level of GOA unit can control one or more rows of sub-pixels through one or more rows of interconnected gate lines. In the embodiment of the present application, only one row of sub-pixels controlled by each level of GOA unit is taken as an example for description. That is, the gate driving signal line is connected to the gate line. This means that one gate driving signal line is connected to one row of gate lines cascaded with each other. This uses the row of gate lines to control the sub-pixel row corresponding to the row of gate lines and the sub-pixel row corresponding to other gate lines connected to the row of gate lines.

The types of gate driving signal lines specifically include clock signal lines (CK), start signal lines (STV), constant voltage high potential lines (VGH), and constant voltage low potential lines (VGL). The types of gate driving signal lines can be selected and set according to the actual situation. It should be noted that not every pixel (each group of sub-pixels) has a gate driving signal line inside, and only some pixels (part of the group of sub-pixels) have. As long as each selected gate driving signal line is set in each between certain two sub-pixels in the row sub-pixels. For example: if you select the clock signal line (CK), start signal line (STV), constant voltage high potential line (VGH) and constant voltage low potential line (VGL) these four gate drive signal lines, in each row of sub-pixels, there is a clock signal line between certain two sub-pixels, a start signal line between certain two sub-pixels, a constant voltage high potential line between two sub-pixels, and a constant voltage low potential line between certain two sub-pixels, and the above-mentioned certain two sub-pixels may be the same two sub-pixels, or may be two different sub-pixels. In the embodiments of the present application, for convenience of description, it is taken as an example that each pixel unit (each group of sub-pixels) has a gate driving signal line inside.

It should also be noted that at least two gate driving signal lines are provided between two columns of sub-pixels adjacent to the gate driving signal line. In other words, in order to provide sufficient gate driving signals for each row of sub-pixels, when a gate driving signal line is provided between two adjacent columns of sub-pixels, at least two gate driving signal lines are generally provided. And it can be understood that, in order to ensure that the aperture ratio of the pixel is not too small, when the gate driving signal line is arranged between two adjacent columns of sub-pixels, only two gate driving signal lines may be provided between two adjacent columns of sub-pixels.

Certain two gate driving signal lines inside each pixel unit (each group of sub-pixels) may be the same type of gate driving signal lines or may be different types of gate driving signal lines. In addition, certain two gate driving signal lines of each row of sub-pixels may be the same type of gate driving signal lines or may be different types of gate driving signal lines.

In details, an embodiment of the present application provides a display panel integrated with a gate driving circuit in a display area. The display panel has a single data line, or a single gate driving signal line, or a data line and a data line side by side, or the gate driving signal line and the gate driving signal line are arranged side by side between any same adjacent two columns of sub-pixels. Therefore, for the data line and the gate driving signal line, only the data line or only the gate driving signal line is provided between any two adjacent columns of sub-pixels. Therefore, the gate driving signal line and the data line are not arranged side by side between any same adjacent two columns of sub-pixels. In order to further reduce the frame of the display panel in the display panel with integrated gate driving circuit, the data line and the gate driving signal line may be arranged side by side when the gate driving circuit is led out from the display area. Between two adjacent columns of sub-pixels, the data line is susceptible to interference from the parasitic capacitance generated between the gate driving signal line and the data line. As a result, the data voltage maintained by the pixel corresponding to the new data line during image display is unstable, and the display panel has a problem of abnormal picture.

Further, the display panel also includes a gate driving signal module (GOA module). The gate driving signal module is used to connect the gate driving signal line to the gate line and control the timing of the gate driving signal line. Specifically, in a gate driving circuit such as a GOA circuit, each level of GOA unit includes one or more rows of interconnected gate lines. For each level of GOA unit, the gate driving signal module is used to connect the gate driving signal line to one row of the gate lines cascaded with each other. As a result, the gate driving signal line is connected to the cascaded gate lines through the row of gate lines. Each gate driving signal module can integrate different control signals. This allows the gate driving signal module to be used to connect different kinds of gate driving signal lines with the gate lines.

Therefore, the embodiment of the present application adopts a modular design. Single or multiple gate driving signal lines are between two adjacent columns of sub-pixels. The single or multiple gate driving signal lines are connected to the corresponding gate lines through the gate driving signal module. Therefore, the gate driving signal module is used to perform corresponding timing control on the single or multiple gate driving signal lines. It should be emphasized that the gate lines, gate driving signal lines, and gate driving signal modules are all gate driving circuits. That is, the gate line, the gate driving signal line, and the gate driving signal module together constitute a gate driving circuit.

Figure 2:
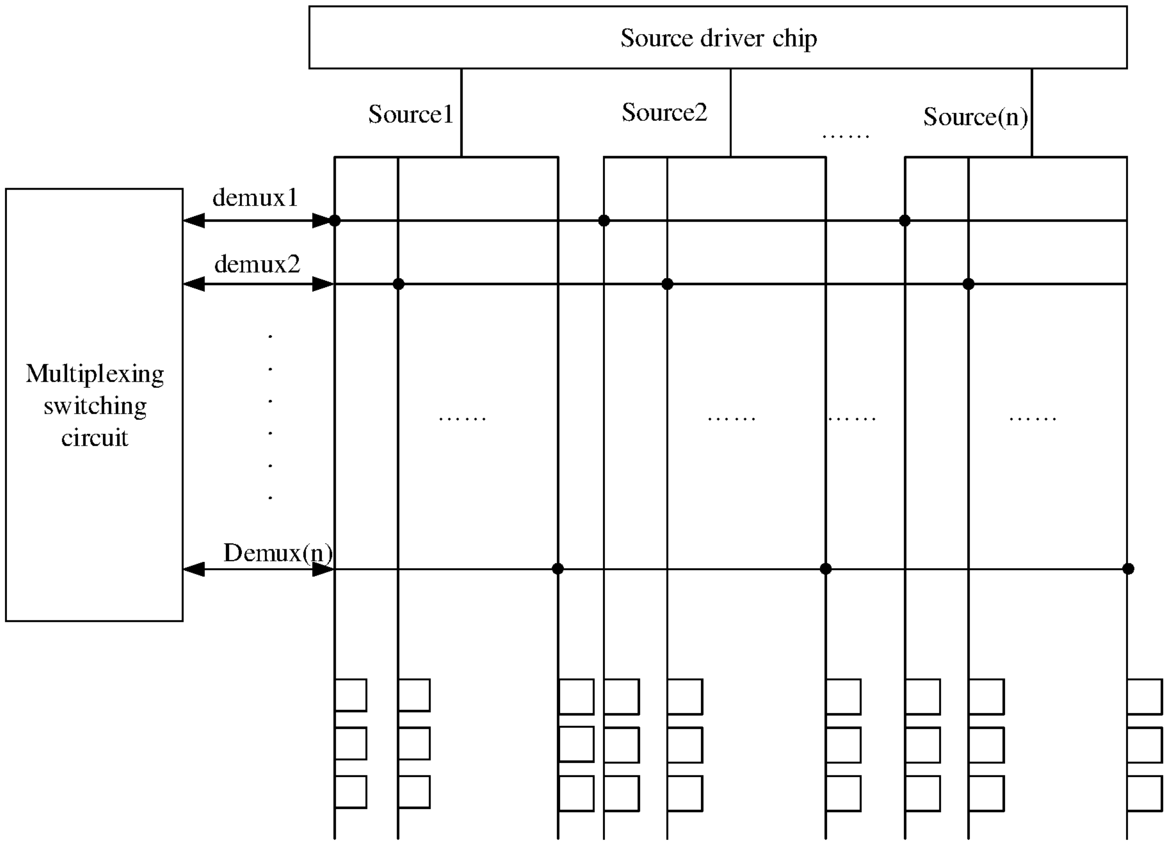
FIG. 2 is a schematic diagram of a structure of a multiplexed display panel in the prior art.

FIG. 2 is a schematic diagram of the structure of a multiplexed display panel in the prior art. As shown in FIG. 2, the multiplexing (Demux) technology of the display panel refers to: in order to reduce the number of output channels of the source driver chip, by adding a multiplexing (Demux) switching circuit in the driving circuit of the display panel. The multiplexing switching circuit outputs multiple multiplexed signals demux1, demux2 . . . dumux(n). Each output channel is time-shared through multiple multiplexed signals. For example, Source1, Source2 . . . Source(n) divides multiple data lines and provides the data voltage output by each output channel to the divided multiple data lines in a time-sharing manner. Thereby, the output channel of the source driver chip is reduced exponentially. As shown in FIG. 2, the multiplexing switching circuit outputs n multiplexed signals. The n data lines of each output channel are opened by time-sharing through n multiplexed signals. In this way, the data voltage output by each output channel is provided to the display panel of n data lines in a time-sharing manner. It can be called a 1-to-n multiplexed display panel.

Based on this, it should be noted that if the display panel provided by the embodiment of the present application is a multiplexed display panel, if multiple data lines arranged side by side between two adjacent columns of sub-pixels are controlled on and off in a time-sharing manner by different multiplexed signals, then the multiple data lines will be turned on at different times due to different multiplexed signals. This causes mutual interference between the multiple data lines. Therefore, in the embodiment of the present application, multiple data lines arranged side by side between two adjacent columns of sub-pixels are controlled on and off by the same multiplexing control signal. As a result, multiple data lines between two adjacent columns of sub-pixels are turned on or off at the same time, thereby reducing mutual interference.

Two specific structures of multiplex display panels provided by the embodiments of the present application are given below for a 1-to-2 multiplexed display panel and a 1-to-3 multiplexed display panel respectively. The position distribution relationship among the sub-pixels, data lines, and gate drive signal lines in the multiplexed display panels of these two specific structures and the circuit connection relationship are described in detail. For the convenience of description, FIGS. 3 to 12 in the embodiments of the present application all use a certain row of pixels as an example for description.

It should be noted that the two groups of periodically arranged sub-pixels of the first repeating unit in the first embodiment and the second repeating unit in the second embodiment of the present application are all arranged periodically with red, green, and blue (R, G, B). That is, the first group of first subpixels, the first group of second subpixels, and the first group of third subpixels are the first red subpixel R1, the first green subpixel G1, and the first blue subpixel B1, respectively. The second group of first subpixels, the second group of second subpixels, and the second group of third subpixels are respectively a second red subpixel R2, a second green subpixel G2, and a second blue subpixel B2.

It can be understood that the specific color arrangement of each group of sub-pixels is not limited to the periods of red, green, and blue, nor is it limited to the three colors of red, green, and blue. Moreover, the specific color arrangement of each group of sub-pixels may be the same or different, which is not limited here.

First Embodiment

Figure 3:
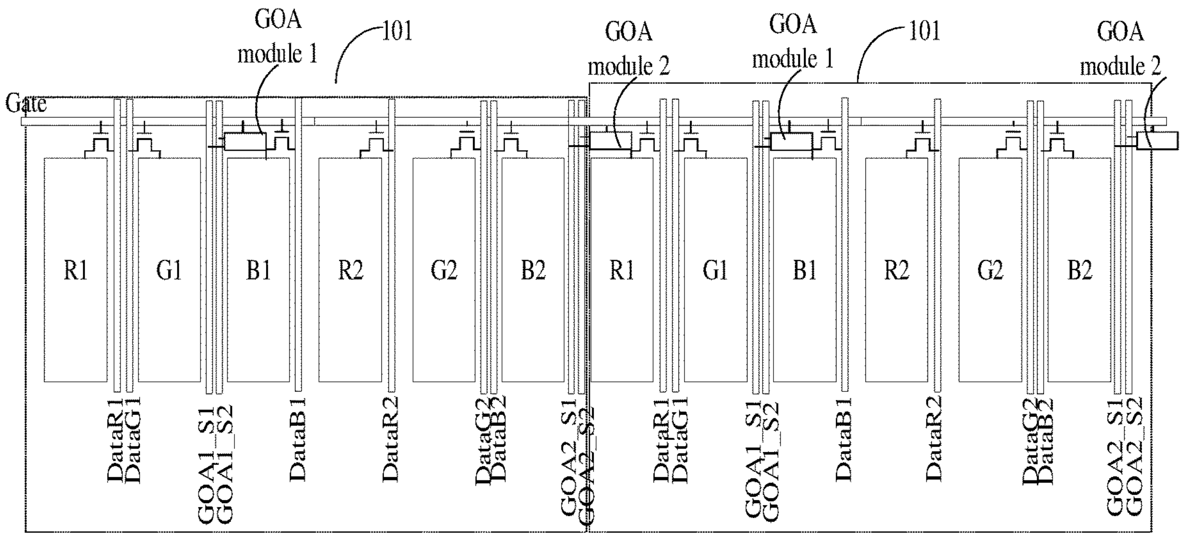
FIG. 3 is a positional distribution diagram of sub-pixels, data lines, and gate driving signal lines of a 1-to-2 multiplexed display panel according to an embodiment of the application.
Figure 6:
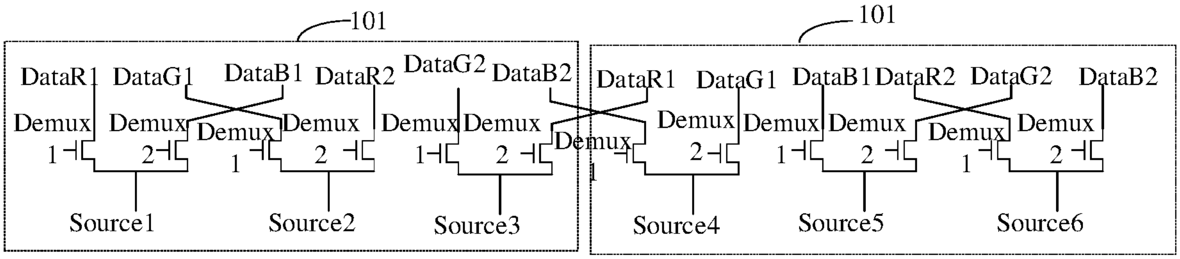
FIG. 6 is a circuit connection diagram of data lines of a 1-to-2 multiplexed display panel according to an embodiment of the application.

If the display panel provided by the embodiment of the present application is a 1-to-2 multiplexed display panel. FIG. 3 is a positional distribution diagram of sub-pixels, data lines, and gate driving signal lines of a one-to-two multiplexed display panel according to an embodiment of the application. FIG. 6 is a circuit connection diagram of data lines of a 1-to-2 multiplexed display panel provided by an embodiment of the application. FIG. 6 can correspond to the actual demux circuit connection of the data line in FIG. 3.

As shown in FIG. 3, the 1-to-2 multiplexed display panel includes a plurality of first repeating units 101 arranged in sequence. Each first repeating unit 101 includes two groups of periodically arranged red, green and blue sub-pixels, a data line corresponding to each sub-pixel, and at least two gate driving signal lines corresponding to each group of red, green and blue sub-pixels. The gate driving signal lines corresponding to the first group of red, green and blue sub-pixels are the first gate driving signal lines. The gate driving signal lines corresponding to the second group of red, green and blue sub-pixels are the second gate driving signal lines. As shown in FIG. 3, two first gate driving signal lines, namely GOA1_S1 and GOA1_S2, are provided for the first group of red, green, and blue sub-pixels of each first repeating unit 101. The second group of red, green and blue sub-pixels are provided with two second gate driving signal lines, namely GOA2_S1 and GOA2_S2. It can be understood that the actual number of the first gate driving signal line and the second gate driving signal line is not necessarily two and may be more than two. The two shown in FIG. 3 are only examples.

The two first gate driving signal lines of the first group of red, green and blue sub-pixels are GOA1_S1 and GOA1_S2. The second group of red, green and blue sub-pixels are provided with two second gate driving signal lines, namely GOA2_S1 and GOA2_S2. Any two of the four signal lines may be the same type of gate driving signal lines or different types of gate driving signal lines. In addition, any two gate driving signal lines in the red, green and blue sub-pixels periodically arranged in each row of sub-pixels may also be the same type of gate driving signal lines or different types of gate driving signal lines. In this embodiment, the two first gate driving signal lines of the first group of red, green and blue sub-pixels are GOA1_S1 and GOA1_S2. The two second gate driving signal lines of the second group of red, green and blue sub-pixels are GOA2_S1 and GOA2_S2, which are just examples. In specific applications, the same or different types of gate drive signal lines can be set in each row of sub-pixels according to actual conditions.

Figure 4:
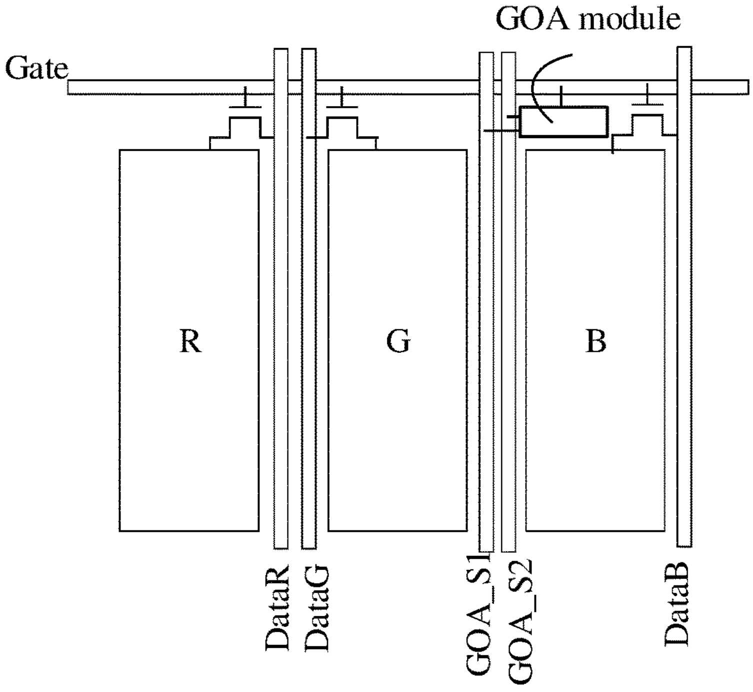
FIG. 4 is a positional distribution diagram of a first group of red, green and blue sub-pixels and their corresponding data lines and gate driving signal lines in a first repeating unit of a 1-to-2 multiplexed display panel provided by an embodiment of the application.
Figure 5:
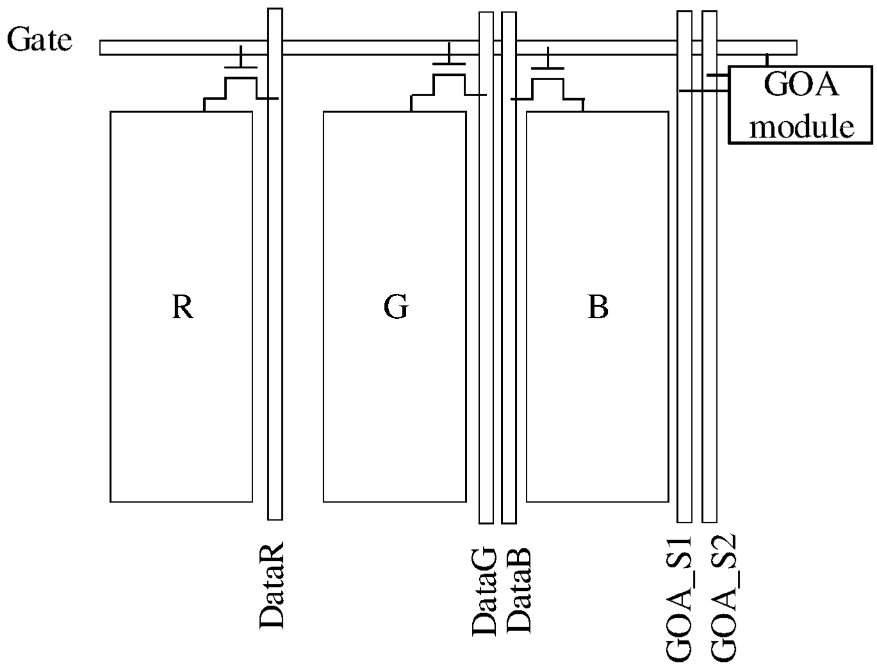
FIG. 5 is a position distribution diagram of a second group of red, green and blue sub-pixels and their corresponding data lines and gate driving signal lines in a first repeating unit of a 1-to-2 multiplexed display panel provided by an embodiment of the application.

Specifically, FIG. 4 is a position distribution diagram of the first group of red, green, and blue sub-pixels and their corresponding data lines and gate driving signal lines in the first repeating unit of the 1-to-2 multiplexed display panel provided by an embodiment of the application. FIG. 5 is a position distribution diagram of the second group of red, green, and blue sub-pixels and their corresponding data lines and gate driving signal lines in the first repeating unit of the 1-to-2 multiplexed display panel provided by an embodiment of the application. In other words, the embodiment of the present application provides two basic distribution structures of data lines and gate driving signal lines for a 1-to-2 multiplexed display panel. The position distribution of the first group of red, green and blue sub-pixels and their corresponding data lines and gate drive signal lines is applicable to the data lines DataR and the green sub-pixels corresponding to the red sub-pixel R distributed between the red sub-pixel R and the green sub-pixel G when the data line DataG corresponding to B is the same multiplexed control signal. The position distribution of the second group of red, green and blue sub-pixels and their corresponding data lines and gate drive signal lines is applicable to the data lines DataG and Blue corresponding to the green sub-pixel G distributed between the green sub-pixel G and the blue sub-pixel B when the data line DataB corresponding to the sub-pixel B is the same multiplexed control signal.

Taking the two basic distribution structures of FIGS. 4 and 5 in a common sequence as the first group of red, green, and blue sub-pixels and the second group of red, green, and blue sub-pixels of each first repeating unit 101 of a 1-to-2 multiplexed display panel, the structure of each row of pixels of the 1-to-2 multiplexed display panel shown in FIG. 3 is obtained. In this way, only data lines or gate driving signal lines are distributed between any two adjacent columns of sub-pixels. And it can be ensured that when multiple data lines are distributed between two adjacent columns of sub-pixels, the multiple data lines are all controlled on and off by the same multiplexing control signal without mutual interference. As shown in FIG. 3, the data line DataR1 corresponding to the first red sub-pixel R1 and the data line DataG1 corresponding to the first green sub-pixel G1 are arranged between the first red sub-pixel R1 and the first green sub-pixel G1. At least two first gate driving signal lines (such as GOA1_S1 and GOA1_S2) are arranged between the first green sub-pixel G1 and the first blue sub-pixel B1. The data line DataB1 corresponding to the first blue sub-pixel B1 is disposed between the first blue sub-pixel B1 and the second red sub-pixel R2. The data line DataR2 corresponding to the second red sub-pixel R2 is disposed between the second red sub-pixel R2 and the second green sub-pixel G2. The data line DataG2 corresponding to the second green sub-pixel G2 and the data line DataB2 corresponding to the second blue sub-pixel B2 are disposed between the second green sub-pixel G2 and the second blue sub-pixel B2. At least two second gate driving signal lines (such as GOA2_S1 and GOA2_S2) are arranged between the second blue sub-pixel B2 and the first red sub-pixel R1 of the next first repeating unit 101.

Specifically, as shown in FIG. 6, the 1-to-2 multiplexed display panel generates two multiplexed control signals Demux1 and Demux2 in each scanning line. And the data lines corresponding to every two adjacent sub-pixels are provided with data signals by a common output channel source in a time-sharing manner. Each source represents each output channel of the source driver chip, and each source separates 2 data lines. It can be seen from FIG. 6 that in the two groups of periodically arranged red, green and blue sub-pixels included in the plurality of first repeating units 101, every 4 consecutive sub-pixels constitute the smallest unit of a 1-to-2 multiplexed display panel circuit connection. The least common multiple of 4 and 6 is 12. Therefore, the circuit connection relationship of every two first repeating units 101 is a cycle.

In the first repeating unit 101, the data line DataR1 corresponding to the first red sub-pixel R1 and the data line DataG1 corresponding to the first green sub-pixel G1 are controlled on and off by the first multiplexing control signal Demux1. The data line DataB1 corresponding to the first blue sub-pixel B1 and the data line DataR2 corresponding to the second red sub-pixel R2 are controlled on and off by the second multiplexing control signal Demux2. The data line DataG2 corresponding to the second green sub-pixel G2 and the data line DataB2 corresponding to the second blue sub-pixel B2 are turned on and off by the first multiplexing control signal Demux1.

In the second first repeating unit 101, the data line DataR1 corresponding to the first red sub-pixel R1 and the data line DataG1 corresponding to the first green sub-pixel G1 are controlled on and off by the second multiplexing control signal Demux2. The data line DataB1 corresponding to the first blue sub-pixel B1 and the data line DataR2 corresponding to the second red sub-pixel R2 are controlled on and off by the first multiplexing control signal Demux1. The data line DataG2 corresponding to the second green sub-pixel G2 and the data line DataB2 corresponding to the second blue sub-pixel B2 are controlled on and off by the second multiplexing control signal Demux2.

The circuit connection relationship of the periodically arranged sub-pixels in the first repeating unit 101 after the first one and the second one can be deduced by analogy.

Further, as shown in FIG. 3, each first repeating unit 101 further includes two gate driving signal modules. The first gate driving signal module (GOA module 1) is used to connect at least two first gate driving signal lines (such as GOA1_S1 and GOA1_S2) between the first green sub-pixel G1 and the first blue sub-pixel B1 to the corresponding gate line, control the at least two first gate driving signal lines (timing, the second gate driving signal module (GOA module 2) is used to transfer at least two second gate driving signals between the second blue sub-pixel and the first red sub-pixel R1 of the next first repeating unit 101) to be connected to the corresponding gate lines and control the timing of the at least two second gate driving signal lines.

Second Embodiment

Figure 7:
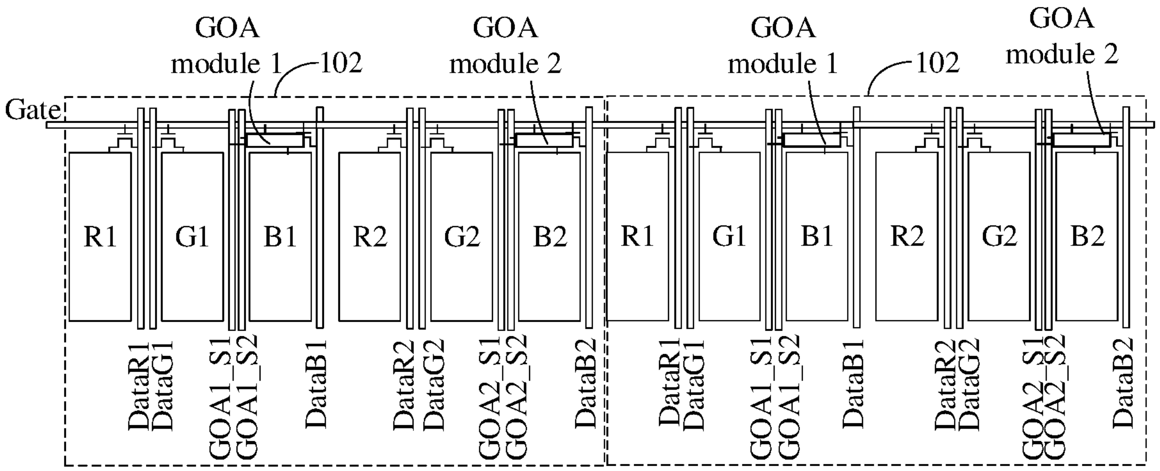
FIG. 7 is a positional distribution diagram of sub-pixels, data lines, and gate driving signal lines of a 1-to-3 multiplexed display panel according to an embodiment of the application.
Figure 8:
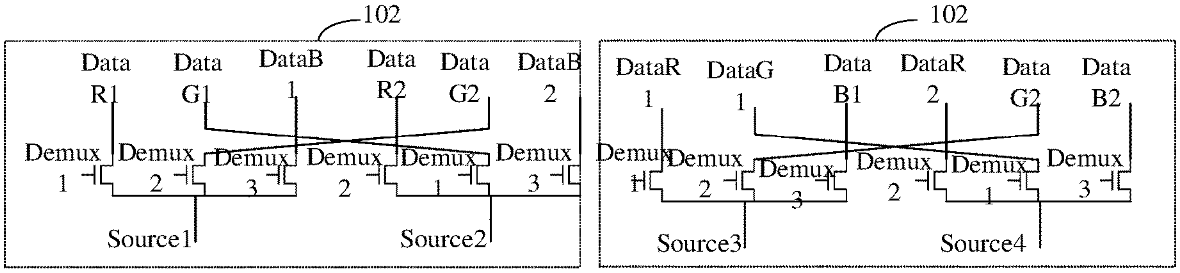
FIG. 8 is a circuit connection diagram of the data lines of a 1-to-3 multiplexed display panel according to the embodiment of the application.

If the display panel provided by the embodiment of the present application is a 1-to-3 multiplexed display panel. FIG. 7 is a positional distribution diagram of sub-pixels, data lines, and gate driving signal lines of a one-to-three multiplexed display panel provided by an embodiment of the application. FIG. 8 is a circuit connection diagram of the data lines of the 1-to-3 multiplexed display panel according to the embodiment of the application. FIG. 8 can correspond to the actual demux circuit connection of the data line in FIG. 7.

As shown in FIG. 7, the 1-to-3 multiplexed display panel includes a plurality of second repeating units 102 arranged in sequence. Each second repeating unit 102 includes two groups of periodically arranged red, green and blue sub-pixels, a data line corresponding to each sub-pixel, and at least two gate driving signal lines corresponding to each group of red, green and blue sub-pixels. The gate driving signal lines corresponding to the first group of red, green and blue sub-pixels are the first gate driving signal lines (such as GOA1_S1 and GOA1_S2). The gate driving signal lines corresponding to the second group of red, green and blue sub-pixels are second gate driving signal lines (such as GOA2_S1 and GOA2_S2).

The two first gate driving signal lines of the first group of red, green and blue sub-pixels are GOA1_S1 and GOA1_S2. The second group of red, green and blue sub-pixels are provided with two second gate driving signal lines, namely GOA2_S1 and GOA2_S2. Any two of the four signal lines may be the same type of gate driving signal lines or different types of gate driving signal lines. In addition, any two gate driving signal lines in the red, green and blue sub-pixels periodically arranged in each row of sub-pixels may also be the same type of gate driving signal lines or different types of gate driving signal lines. In this embodiment, the two first gate driving signal lines of the first group of red, green and blue sub-pixels are GOA1_S1 and GOA1_S2. The two second gate driving signal lines of the second group of red, green and blue sub-pixels are GOA2_S1 and GOA2_S2, which are just examples. In specific applications, the same or different types of gate driving signal lines can be set in each row of sub-pixels according to actual conditions.

It can be seen from FIG. 7 that the position distribution of the first group of red, green, and blue sub-pixels and their corresponding data lines and gate drive signal lines in the second repeating unit 102 of the one-to-three multiplexed display panel is consistent with the positions of the two groups of red, green and blue sub-pixels and their corresponding data lines and gate driving signal lines are the same. And they all adopt the same position distribution as the first group of red, green and blue sub-pixels and their corresponding data lines and gate driving signal lines in the first repeating unit 101 of the 1-to-2 multiplexed display panel. That is, the data line DataR1 corresponding to the first red sub-pixel R1 and the data line DataG1 corresponding to the first green sub-pixel G1 are arranged between the first red sub-pixel R1 and the first green sub-pixel G1. At least two first gate driving signal lines (such as GOA1_S1 and GOA1_S2) are arranged between the first green sub-pixel G1 and the first blue sub-pixel B1. The data line DataB1 corresponding to the first blue sub-pixel B1 is disposed between the first blue sub-pixel B1 and the second red sub-pixel R2. The data line DataR2 corresponding to the second red sub-pixel R2 and the data line DataG2 corresponding to the second green sub-pixel are arranged between the second red sub-pixel R2 and the second green sub-pixel G2. At least two second gate driving signal lines (such as GOA2_S1 and GOA2_S2) are arranged between the second green sub-pixel G2 and the second blue sub-pixel B2. The data line DataB2 corresponding to the second blue sub-pixel B2 is arranged between the second blue sub-pixel B2 and the first red sub-pixel R1 of the next second repeating unit 101.

In this way, only data lines or gate driving signal lines can be distributed between any two adjacent columns of sub-pixels. And it can ensure that when multiple data lines are distributed between two adjacent columns of sub-pixels. These multiple data lines are all controlled on and off by the same multiplexing control signal without mutual interference.

Specifically, as shown in FIG. 8, the 1-to-3 multiplexed display panel generates three multiplexed control signals Demux1, Demux2, and Demux3 in each scanning line. And the three data lines corresponding to each group of red, green and blue sub-pixels provide data signals in a time-sharing manner from a common output channel. Each Source represents each output channel of the source driver chip. Two data lines are separated from each Source. It can be seen from FIG. 8 that 6 consecutive sub-pixels of each second repeating unit 102 constitute the smallest unit of circuit connection of a 1-to-3 multiplexed display panel. Therefore, the circuit connection relationship of each second repeating unit 102 is a cycle.

In each second repeating unit 102, the data line DataR1 corresponding to the first red sub-pixel R1 and the data line DataG1 corresponding to the first green sub-pixel G1 are controlled on and off by the first multiplexing control signal Demux1. The data line DataR2 corresponding to the second red sub-pixel R2 and the data line DataG2 corresponding to the second green sub-pixel G2 are controlled on and off by the second multiplexing control signal Demux2. The data line DataB1 corresponding to the first blue sub-pixel B1 and the data line DataB2 corresponding to the second blue sub-pixel B2 are controlled on and off by the third multiplexing control signal Demux3. It can be seen from FIG. 8 that every 6 consecutive sub-pixels constitute the smallest unit of circuit connection of a 1-to-3 multiplexed display panel.

Figure 10:
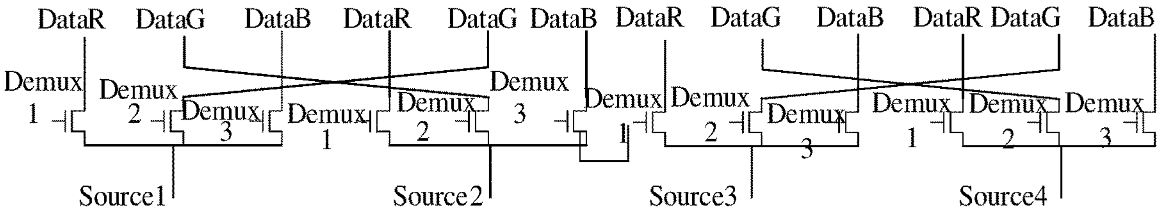
FIG. 10 is a circuit connection diagram of the data lines of a 1-to-3 multiplexed display panel of the prior art.

It should be noted that the circuit connection diagrams of the data lines of the 1-to-3 multiplexed display panel of the prior art shown in FIG. 8 and FIG. 10 are compared. The embodiment of the present application exchanges the first multiplexing control signal Demux1 for controlling the data line DataR2 corresponding to the second red sub-pixel R2 in the second repeating unit 102 of the prior art 1-to-3 multiplexed display panel and the second multiplexing control signal Demux2 for controlling the data line DataG2 corresponding to the second green sub-pixel G2. This enables the data line DataR1 corresponding to the first red sub-pixel R1 and the data line DataG1 corresponding to the first green sub-pixel G1 distributed between the first red sub-pixel R1 and the first green sub-pixel G1 of the second repeating unit 102 to be switched on and off by the same multiplexing control signal (first multiplexing control signal Demux1). This also enables the data line DataR2 corresponding to the second red sub-pixel R2 and the data line DataG2 corresponding to the second green sub-pixel G2 distributed between the second red sub-pixel R2 and the second green sub-pixel G2 to be switched on and off by the same multiplexing control signal (second multiplexing control signal Demux2).

Figure 9:
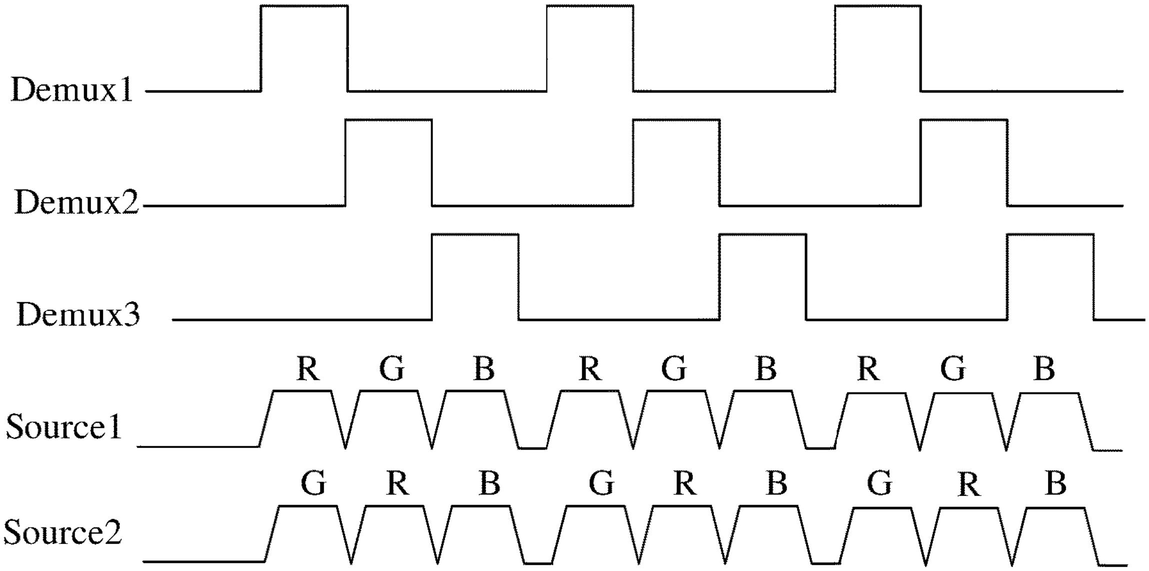
FIG. 9 is a working sequence control diagram of a 1-to-3 multiplexed display panel provided by an embodiment of the application.

FIG. 9 is a working sequence control diagram of a 1-to-3 multiplexed display panel provided by an embodiment of the application. As shown in combination with FIG. 8 and FIG. 9, a first multiplexing control signal demux1 is used to drive a first red sub-pixel R1 and a first green sub-pixel G1. A second multiplexing control signal demux2 is used to drive a second green sub-pixel G2 and a second red sub-pixel R2. A third multiplexing control signal demux3 is used to drive a first blue sub-pixel B1 and a second blue sub-pixel B2.

Further, as shown in FIG. 7, each second repeating unit 102 further includes two gate driving signal modules. The first gate driving signal module (GOA module 1) is used to connect at least two first gate driving signal lines (such as GOA1_S1 and GOA1_S2) between the first green sub-pixel G1 and the first blue sub-pixel B1 to the corresponding gate line Gate and control the timing of a plurality of first gate driving signal lines. The second gate driving signal module (GOA module 2) is used to connect a plurality of second gate driving signal lines (such as GOA2_S1 and GOA2_S2) between the second green sub-pixel and the second blue sub-pixel to the corresponding gate line Gate and control the timing of a plurality of second gate driving signal lines.

Figure 11:
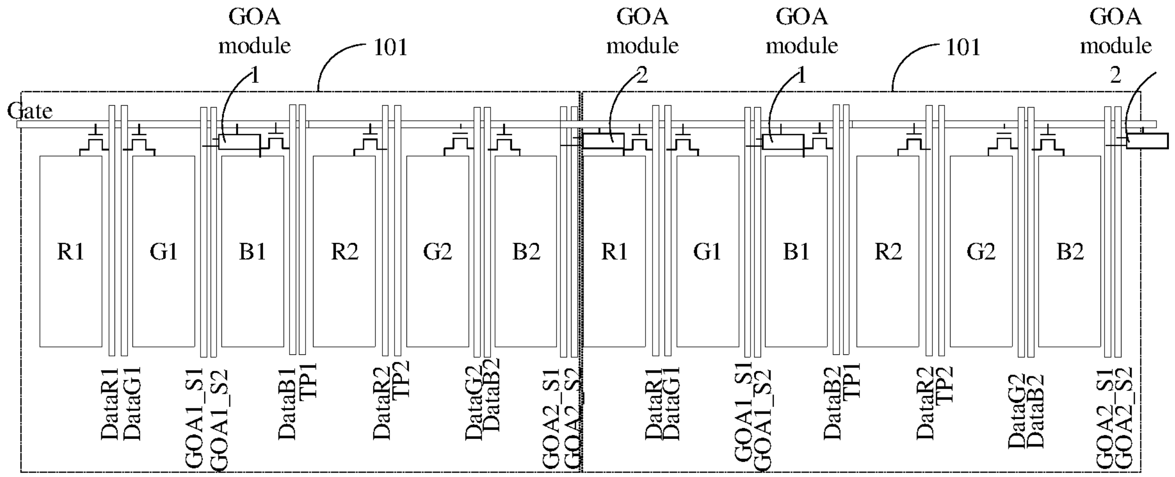
FIG. 11 is a positional distribution diagram of a 1-to-2 multiplexed display panel including touch signal lines provided by an embodiment of the application.
Figure 12:
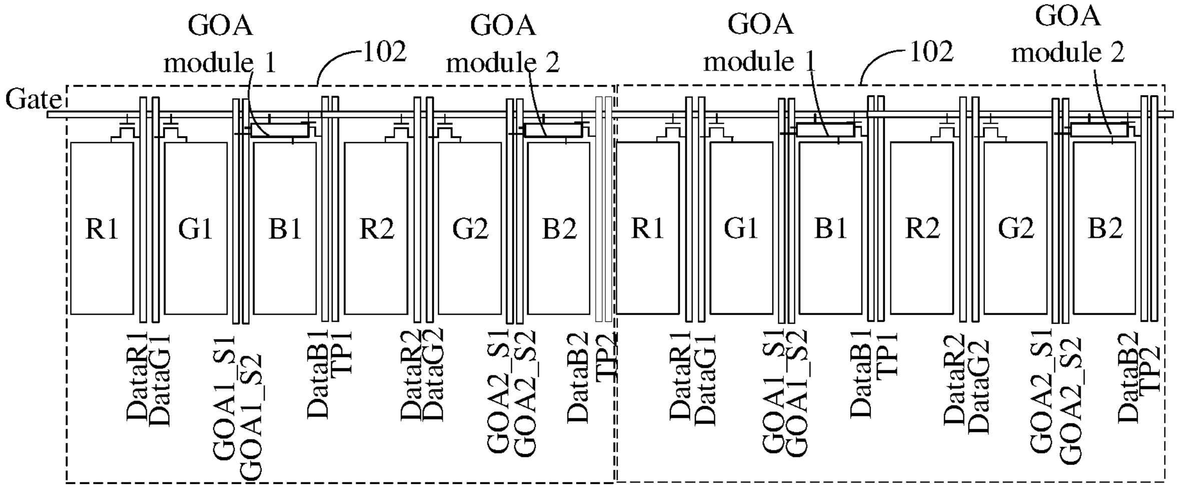
FIG. 12 is a positional distribution diagram of a 1-to-3 multiplexed display panel including touch signal lines provided by an embodiment of the application.

It should be noted that, if the display panel provided by the embodiment of the present application is a touch screen display panel, it also includes a touch (TP) signal line. Since each group of red, green, and blue sub-pixels includes one TP signal line, each first repeating unit 101 and each second repeating unit 102 respectively includes two TP signal lines. FIG. 11 is a schematic diagram of FIG. 3 including the TP signal line. As shown in FIG. 11, in the first repeating unit 101 of each one-to-two multiplexed display panel provided by the embodiment of the present application, the first TP signal line TP1 may correspond to the first blue sub-pixel B1. The data line DataB1 is arranged side by side between the first blue sub-pixel B1 and the second red sub-pixel R2. The second TP signal line TP2 and the data line DataR2 corresponding to the second red sub-pixel R2 may be arranged side by side between the second red sub-pixel R2 and the second green sub-pixel G2. FIG. 12 is a schematic diagram of FIG. 7 including the TP signal line. As shown in FIG. 12, in the second repeating unit 102 of each 1-to-3 multiplexed display panel provided by the embodiment of the present application, the first TP signal line TP1 and the data line DataB1 corresponding to the first blue sub-pixel B1 may be arranged side by side between the first blue sub-pixel B1 and the second red sub-pixel R2. The second TP signal line TP2 and the data line DataB2 corresponding to the second blue sub-pixel B2 may be arranged side by side between the second blue sub-pixel B2 and the first red sub-pixel R1 of the next second repeating unit 102.

It is understandable that the display panel with integrated gate driving circuit in the display area provided by the embodiment of the present application can be applied to the 1-to-2 multiplexed display panel of the first embodiment and the 1-to-3 multiplex display panel of the second embodiment. Multiplexed display panels can also be used for other types of multiplexed display panels. It is not limited here, and the basic principles are the same, but the actual circuit connection mode may be changed accordingly, and it will not be repeated here.

It can be understood that for those of ordinary skill in the art, equivalent substitutions or changes can be made according to the technical solution of the present application and its inventive concept. All these changes or replacements shall fall within the protection scope of the appended claims of this application.

What is claimed is:

1. A display panel integrated with a gate driving circuit in a display area, comprising:

sub-pixels arranged in the display area, and gate lines, data lines, and gate driving signal lines for driving the sub-pixels, wherein the data lines and the gate driving signal lines are arranged perpendicular to the gate lines;

wherein the gate driving signal lines are connected to the gate lines, and wherein the gate driving signal lines are arranged between two rows of the sub-pixels adjacent to the gate driving signal lines, the data lines are arranged between two columns of the sub-pixels adjacent to the data lines, and there is only one of the gate driving signal lines and the data lines between any two adjacent columns of the sub-pixels, such that the gate driving signal lines and the data lines are not arranged side by side between any of the same two adjacent columns of the sub-pixels;

wherein at least two gate driving signal lines are provided between the two columns of the sub-pixels adjacent to the gate driving signal lines;

wherein the display panel further comprises a gate driving signal circuit, and the gate driving signal circuit is used to connect the gate driving signal lines to the gate lines and control timing of the gate driving signal lines;

wherein the display panel is a 1-to-2 multiplexed display panel, the 1-to-2 multiplexed display panel comprises a plurality of first repeating structures arranged in sequence, and each of the first repeating structures comprises two groups of periodically arranged sub-pixels, the data lines corresponding to each of the sub-pixels, and at least two of the gate driving signal lines corresponding to each group of the sub-pixels; wherein the gate driving signal lines corresponding to the sub-pixels in a first group are first gate driving signal lines, and the gate driving signal lines corresponding to the sub-pixels in a second group are second gate driving signal lines;

wherein the data lines corresponding to first sub-pixels of a first group and the data lines corresponding to second sub-pixels of a first group are arranged between first sub-pixels of the first group and second sub-pixels of the first group, at least two of the first gate driving signal lines are arranged between second sub-pixels of the first group and third sub-pixels of the first group, the data lines corresponding to third sub-pixels of the first group are arranged between third sub-pixels of the first group and first sub-pixels of a second group, the data lines corresponding to the first sub-pixels of the second group are arranged between the first sub-pixels of the second group and the second sub-pixels of the second group, the data lines corresponding to the second sub-pixels of the second group and the data lines corresponding to third sub-pixels of the second group are arranged between the second sub-pixels of the second group and third sub-pixels of the second group, and at least two of the second gate driving signal lines are arranged between third sub-pixels of the second group and first sub-pixels of the first group of a next first repeating structure.

2. The display panel integrated with the gate driving circuit in the display area according to claim 1, wherein the 1-to-2 multiplexed display panel generates two multiplexed control signals in each scan line time-sharing, and two data lines corresponding to each two adjacent columns of sub-pixels provide data signals in time sharing from a common output channel;

in every two of the first repeating structures, in a first of the first repeating structures, the data lines corresponding to first sub-pixels of the first group and the data lines corresponding to second sub-pixels of the first group are controlled on and off by first multiplexing control signals, the data lines corresponding to the third sub-pixels in the first group and the data lines corresponding to the first sub-pixels in the second group are controlled on and off by second multiplexing control signals, and the data lines corresponding to the second sub-pixels of the second group and the data lines corresponding to the third sub-pixels of the second group are controlled on and off by the first multiplexing control signals;

in the second of the first repeating structures, the data lines corresponding to first sub-pixels of the first group and the data lines corresponding to second sub-pixels of the first group are controlled on and off by the second multiplexing control signals, the data lines corresponding to third sub-pixels of the first group and the data lines corresponding to first sub-pixels of the second group are controlled on and off by the first multiplexing control signals, and the data lines corresponding to the second sub-pixels of the second group and the data lines corresponding to third sub-pixels of the second group are controlled on and off by the second multiplexing control signals.

3. The display panel integrated with the gate driving circuit in the display area according to claim 1, wherein each of the first repeating structures further comprises two gate driving signal circuits, a first gate driving signal circuit is used to connect at least two of the first gate driving signal lines between second sub-pixels of the first group and third sub-pixels of the first group to corresponding gate lines and control timing of at least two of the first gate driving signal lines, and a second gate driving signal circuit is used to connect at least two of the second gate driving signal lines between third sub-pixels of the second group and first sub-pixels of the first group of a next first repeating structure to corresponding gate lines and control timing of the second gate driving signal line.

4. The display panel integrated with the gate driving circuit in the display area according to claim 1, wherein the gate driving signal line comprises a clock signal line, a start signal line, a constant voltage high potential line, and a constant voltage low potential line.

5. A display panel integrated with a gate driving circuit in a display area, comprising:

sub-pixels arranged in the display area, and gate lines, data lines, and gate driving signal lines for driving the sub-pixels, wherein the data lines and the gate driving signal lines are arranged perpendicular to the gate lines;

wherein the gate driving signal lines are connected to the gate lines, and wherein the gate driving signal lines are arranged between two rows of the sub-pixels adjacent to the gate driving signal lines, the data lines are arranged between two columns of the sub-pixels adjacent to the data lines, and there is only one of the gate driving signal lines and the data lines between any two adjacent columns of the sub-pixels, such that the gate driving signal lines and the data lines are not arranged side by side between any of the same two adjacent columns of the sub-pixels;

wherein at least two gate driving signal lines are provided between the two columns of the sub-pixels adjacent to the gate driving signal lines;

wherein the display panel is a multiplexed display panel, and a plurality of the data lines arranged side by side between the two adjacent columns of the sub-pixels are controlled on and off by the same multiplexing control signal;

wherein the display panel is a 1-to-3 multiplexed display panel, the 1-to-3 multiplexed display panel comprises a plurality of second repeating structures arranged in sequence, each of the second repeating structures comprises two groups of periodically arranged sub-pixels, the data lines corresponding to each of the sub-pixels, and at least two gate driving signal lines corresponding to each group of sub-pixels; wherein the gate driving signal lines corresponding to the sub-pixels of the first group are first gate driving signal lines, and the gate driving signal lines corresponding to the second group of sub-pixels are second gate driving signal lines;

the data lines corresponding to first sub-pixels of the first group and the data lines corresponding to second sub-pixels of the first group are arranged between first sub-pixels of the first group and second sub-pixels of the first group, at least two of the first gate driving signal lines are arranged between second sub-pixels of the first group and third sub-pixels of the first group, the data lines corresponding to third sub-pixels of the first group are arranged between third sub-pixels of the first group and first sub-pixels of the second group, the data lines corresponding to the first sub-pixels in the second group and the data lines corresponding to the second sub-pixels in the second group are arranged between the first sub-pixels in the second group and the second sub-pixels in the second group, at least two of the second gate driving signal lines are arranged between the second sub-pixels of the second group and third sub-pixels of the second group, and the data lines corresponding to the third sub-pixels of the second group are arranged between the third sub-pixels of the second group and the first sub-pixels of the first group of the next second repeating structure.

6. The display panel integrated with the gate driving circuit in the display area according to claim 5, wherein the 1-to-3 multiplexed display panel generates 3 multiplexed control signals in each scan line time-sharing, and the three data lines corresponding to each group of red, green and blue sub-pixels are provided with data signals by a common output channel in a time-sharing manner;

in each of the second repeating structures, the data lines corresponding to first sub-pixels of the first group and the data lines corresponding to second sub-pixels of the first group are controlled on and off by the first multiplexing control signal, the data lines corresponding to the first sub-pixels of the second group and the data lines corresponding to the second sub-pixels of the second group are controlled on and off by the second multiplexing control signal, and the data lines corresponding to third sub-pixels of the first group and the data lines corresponding to third sub-pixels of the second group are controlled on and off by the third multiplexing control signal.

7. The display panel integrated with the gate driving circuit in the display area according to claim 6, wherein each of the second repeating structures further comprises two gate driving signal circuits, the first gate driving signal modulo circuit is used to connect at least two of the first gate driving signal lines between second sub-pixels of the first group and third sub-pixels of the first group to the corresponding gate lines and control timing of at least two of the first gate driving signal lines, and the second gate driving signal circuit is used to connect at least two of the second gate driving signal lines between the second sub-pixels of the second group and third sub-pixels of the second group to the corresponding gate lines and control timing of at least two of the second gate driving signal lines.

8. A display panel comprising:

sub-pixels arranged in the display area, and gate lines, data lines, and gate driving signal lines for driving the sub-pixels, wherein the data lines and the gate driving signal lines are arranged perpendicular to the gate lines;

wherein the gate driving signal lines are connected to the gate lines, and wherein the gate driving signal lines are arranged between two rows of the sub-pixels adjacent to the gate driving signal lines, the data lines are arranged between two columns of the sub-pixels adjacent to the data lines, and there is only one of the gate driving signal lines and the data lines between any two adjacent columns of the sub-pixels, such that the gate driving signal lines and the data lines are not arranged side by side between any of the same two adjacent columns of the sub-pixels, and wherein the gate driving signal line comprises a clock signal line, a start signal line, a constant voltage high potential line, and a constant voltage low potential line;

wherein the display panel further comprises a gate driving signal circuit, and the gate driving signal circuit is used to connect the gate driving signal lines to the gate lines and control timing of the gate driving signal lines;

wherein the display panel is a 1-to-2 multiplexed display panel, the 1-to-2 multiplexed display panel comprises a plurality of first repeating structures arranged in sequence, and each of the first repeating structures comprises two groups of periodically arranged sub-pixels, the data lines corresponding to each of the sub-pixels, and at least two of the gate driving signal lines corresponding to each group of the sub-pixels; wherein the gate driving signal lines corresponding to the sub-pixels in a first group are first gate driving signal lines, and the gate driving signal lines corresponding to the sub-pixels in a second group are second gate driving signal lines;

wherein the data lines corresponding to first sub-pixels of a first group and the data lines corresponding to second sub-pixels of a first group are arranged between first sub-pixels of the first group and second sub-pixels of the first group, at least two of the first gate driving signal lines are arranged between second sub-pixels of the first group and third sub-pixels of the first group, the data lines corresponding to third sub-pixels of the first group are arranged between third sub-pixels of the first group and first sub-pixels of a second group, the data lines corresponding to the first sub-pixels of the second group are arranged between the first sub-pixels of the second group and the second sub-pixels of the second group, the data lines corresponding to the second sub-pixels of the second group and the data lines corresponding to third sub-pixels of the second group are arranged between the second sub-pixels of the second group and third sub-pixels of the second group, and at least two of the second gate driving signal lines are arranged between third sub-pixels of the second group and first sub-pixels of the first group of a next first repeating structure.

9. The display panel according to claim 8, wherein the display panel is a multiplexed display panel, and a plurality of the data lines arranged side by side between the two adjacent columns of the sub-pixels are controlled on and off by the same multiplexing control signal.

10. The display panel according to claim 9, wherein the display panel is a 1-to-3 multiplexed display panel, the 1-to-3 multiplexed display panel comprises a plurality of second repeating structures arranged in sequence, each of the second repeating structures comprises two groups of periodically arranged sub-pixels, the data lines corresponding to each of the sub-pixels, and at least two gate driving signal lines corresponding to each group of sub-pixels; wherein the gate driving signal lines corresponding to the sub-pixels of the first group are first gate driving signal lines, and the gate driving signal lines corresponding to the second group of sub-pixels are second gate driving signal lines;

the data lines corresponding to first sub-pixels of the first group and the data lines corresponding to second sub-pixels of the first group are arranged between first sub-pixels of the first group and second sub-pixels of the first group, at least two of the first gate driving signal lines are arranged between second sub-pixels of the first group and third sub-pixels of the first group, the data lines corresponding to third sub-pixels of the first group are arranged between third sub-pixels of the first group and first sub-pixels of the second group, the data lines corresponding to the first sub-pixels in the second group and the data lines corresponding to the second sub-pixels in the second group are arranged between the first sub-pixels in the second group and the second sub-pixels in the second group, at least two of the second gate driving signal lines are arranged between the second sub-pixels of the second group and third sub-pixels of the second group, and the data lines corresponding to the third sub-pixels of the second group are arranged between the third sub-pixels of the second group and the first sub-pixels of the first group of the next second repeating structure.

11. The display panel according to claim 10, wherein the 1-to-3 multiplexed display panel generates 3 multiplexed control signals in each scan line time-sharing, and the three data lines corresponding to each group of red, green and blue sub-pixels are provided with data signals by a common output channel in a time-sharing manner;

in each of the second repeating structures, the data lines corresponding to first sub-pixels of the first group and the data lines corresponding to second sub-pixels of the first group are controlled on and off by the first multiplexing control signal, the data lines corresponding to the first sub-pixels of the second group and the data lines corresponding to the second sub-pixels of the second group are controlled on and off by the second multiplexing control signal, and the data lines corresponding to third sub-pixels of the first group and the data lines corresponding to third sub-pixels of the second group are controlled on and off by the third multiplexing control signal.

12. The display panel according to claim 11, wherein each of the second repeating structures further comprises two gate driving signal circuits, the first gate driving signal circuit is used to connect at least two of the first gate driving signal lines between second sub-pixels of the first group and third sub-pixels of the first group to the corresponding gate lines and control timing of at least two of the first gate driving signal lines, and the second gate driving signal circuit is used to connect at least two of the second gate driving signal lines between the second sub-pixels of the second group and third sub-pixels of the second group to the corresponding gate lines and control timing of at least two of the second gate driving signal lines.

13. The display panel according to claim 8, wherein the 1-to-2 multiplexed display panel generates two multiplexed control signals in each scan line time-sharing, and two data lines corresponding to each two adjacent columns of sub-pixels provide data signals in time sharing from a common output channel;

in every two of the first repeating structures, in a first of the first repeating structures, the data lines corresponding to first sub-pixels of the first group and the data lines corresponding to second sub-pixels of the first group are controlled on and off by first multiplexing control signals, the data lines corresponding to the third sub-pixels in the first group and the data lines corresponding to the first sub-pixels in the second group are controlled on and off by second multiplexing control signals, and the data lines corresponding to the second sub-pixels of the second group and the data lines corresponding to the third sub-pixels of the second group are controlled on and off by the first multiplexing control signals;

in the second of the first repeating structures, the data lines corresponding to first sub-pixels of the first group and the data lines corresponding to second sub-pixels of the first group are controlled on and off by the second multiplexing control signals, the data lines corresponding to third sub-pixels of the first group and the data lines corresponding to first sub-pixels of the second group are controlled on and off by the first multiplexing control signals, and the data lines corresponding to the second sub-pixels of the second group and the data lines corresponding to third sub-pixels of the second group are controlled on and off by the second multiplexing control signals.

14. The display panel according to claim 8, wherein each of the first repeating structures further comprises two gate driving signal circuits, a first gate driving signal circuit is used to connect at least two of the first gate driving signal lines between second sub-pixels of the first group and third sub-pixels of the first group to corresponding gate lines and control timing of at least two of the first gate driving signal lines, and a second gate driving signal circuit is used to connect at least two of the second gate driving signal lines between third sub-pixels of the second group and first sub-pixels of the first group of a next first repeating structure to corresponding gate lines and control timing of the second gate driving signal line.

* * * * *